US012616904B2

(12) United States Patent
Zhang et al.

(10) Patent No.: US 12,616,904 B2
(45) Date of Patent: May 5, 2026

(54) METHOD, COMPUTER DEVICE, AND STORAGE MEDIUM FOR OBTAINING A VIRTUAL ITEM

(71) Applicant: TENCENT TECHNOLOGY (SHENZHEN) COMPANY LIMITED, Shenzhen (CN)

(72) Inventors: Weisong Zhang, Shenzhen (CN); Chenxing Pei, Shenzhen (CN); Peiyuan Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 143 days.

(21) Appl. No.: 18/343,503

(22) Filed: Jun. 28, 2023

(65) Prior Publication Data

US 2023/0338860 A1      Oct. 26, 2023

Related U.S. Application Data

(63) Continuation of application No. PCT/CN2022/127113, filed on Oct. 24, 2022.

(30) Foreign Application Priority Data

Dec. 10, 2021    (CN) .......................... 202111505067.7

(51) Int. Cl.
*A63F 13/798*      (2014.01)
*A63F 13/537*      (2014.01)
(52) U.S. Cl.
CPC .......... *A63F 13/798* (2014.09); *A63F 13/537* (2014.09)
(58) Field of Classification Search
None
See application file for complete search history.

(56) References Cited

U.S. PATENT DOCUMENTS 9,586,133 B1 *    3/2017    Kim ...................... A63F 13/335
2015/0363401 A1 *  12/2015    Chen ................. G06F 16/24578
                                                            707/723

(Continued)

FOREIGN PATENT DOCUMENTS

CN          107886362 A      4/2018
CN          110111149 A      8/2019

(Continued)

OTHER PUBLICATIONS

The World Intellectual Property Organization (WIPO) International Search Report for PCT/CN2022/127113 Jan. 11, 2023 6 Pages (including translation).

(Continued)

*Primary Examiner* — Ronald Laneau
(74) *Attorney, Agent, or Firm* — Anova Law Group, PLLC

(57) ABSTRACT

The present disclosure discloses a method, an apparatus, a device, a medium, and a program product for obtaining a virtual item. The method includes: displaying a competition entrance (202) to a ranking mode; controlling a virtual role of a user account to participate in a ranking competition match (204) in response to a trigger operation on the competition entrance; displaying a virtual ranked coin (206) obtained in a current game season by participating in the ranking competition match in response to successful participation; and obtaining a virtual item exclusive to the ranking mode from a ranking mall exclusive to the ranking mode based on the virtual ranked coin (208). The present disclosure provides a method for obtaining a rare virtual item, so that an ordinary non-paying player can also obtain a rare virtual item.

20 Claims, 15 Drawing Sheets

(56) References Cited

U.S. PATENT DOCUMENTS

| | | | |
|---|---|---|---|
| 2020/0364981 A1 | 11/2020 | Mileski | |
| 2023/0338860 A1 | 10/2023 | Zhang et al. | |
| 2023/0347242 A1* | 11/2023 | Zhang | A63F 13/537 |

FOREIGN PATENT DOCUMENTS

| | | | |
|---|---|---|---|
| CN | 110570287 A | 12/2019 | |
| CN | 111659126 A | 9/2020 | |
| CN | 113546414 A | 10/2021 | |
| CN | 114130012 A | 3/2022 | |
| CN | 114130018 A | 3/2022 | |
| JP | 2009000524 A | 1/2009 | |
| JP | 2018015576 A | 2/2018 | |
| JP | 2020198959 A | 12/2020 | |
| JP | 2021023742 A | 2/2021 | |

OTHER PUBLICATIONS

The Japan Patent Office (JPO) Notification of Reasons for Refusal for Application No. 2024-522142 Aug. 5, 2025 11 Pages(including translation).

Patch 2.6 preview—League of Legends: Wild Lift, YouTube [online] [video],2021Nov. 30,2025,[searched on Aug. 5, 2013],Obtained from <https://www.youtube.com/watch?v=GeXeGygOcIU>.

Wild Rift Season 4 Is Here | New Ranked Rewards | Ranked Store and More,YouTube[online] [video],Dec. 5, 2021,[searched on Aug. 5, 2025], Obtained from <https://www.youtube.com/watch?v=Cwi -QzEe5zw>.

Pubg: Battlegrounds, Ranked Match Season 12 Ends & Rewards,[online], Jul. 27, 2021, Retrieved from <https://pubg.com/ja/news/683>.

[Knives Out] Season S18 Exclusive Skin Summary, Game With [online], Jun. 15, 2021, Retrieved from <https://gamewith.jp/knives-out/article/show/281898>.

The Japan Patent Office (JPO) Notice of Reasons for Refusal for Application No. 2024-522142 Apr. 1, 2025 10 Pages (including translation).

/dev: Upgrading Ranked Rewards, Riot Games [online], Dec. 2, 2021, [Retrieved Mar. 19, 2025], Internet: <URL: https://wildrift.leagueoflegends.com/ja-jp/news/dev/dev-upgrading-ranked-rewards/>.

[LoL Wild Rift] Introduction to game modes and basic game flow [Wild Rift], GameWith [online], Dec. 3, 2020, [Retrieved Mar. 19, 2025], Internet: <URL: https://gamewith.jp/wildrift/article/show/234923>.

[Apex] What is ranked match? Difference from casual, rank specifications and how to play Basics, Gameonlife [online], Nov. 27, 2021, [Retrieved Mar. 21, 2025], Internet: <URL: https://gemajolife.net/apexlegends/4835> (Reference showing well-known technology).

Fortnite XP Table, 6th Grade Room—Games, Novels, and More—[online], Jun. 23, 2019, [Retrieved Mar. 21, 2025], Internet: <URL: http://rinrin0405.hatenablog.com/entry/2019/06/23/141925> (Reference showing well-known technology).

The Japan Patent Office (JPO), Notice of Reasons for Refusal for Application No. 2024-522142, Jan. 13, 2026, 11 Pages (including translation).

Official event, FF14 Online Wiki [online], Dec. 27, 2021, Source <https://web.archive.org/web/20210927021704/https://ff14wiki.info/? Official event>.

* cited by examiner

Computer system 100

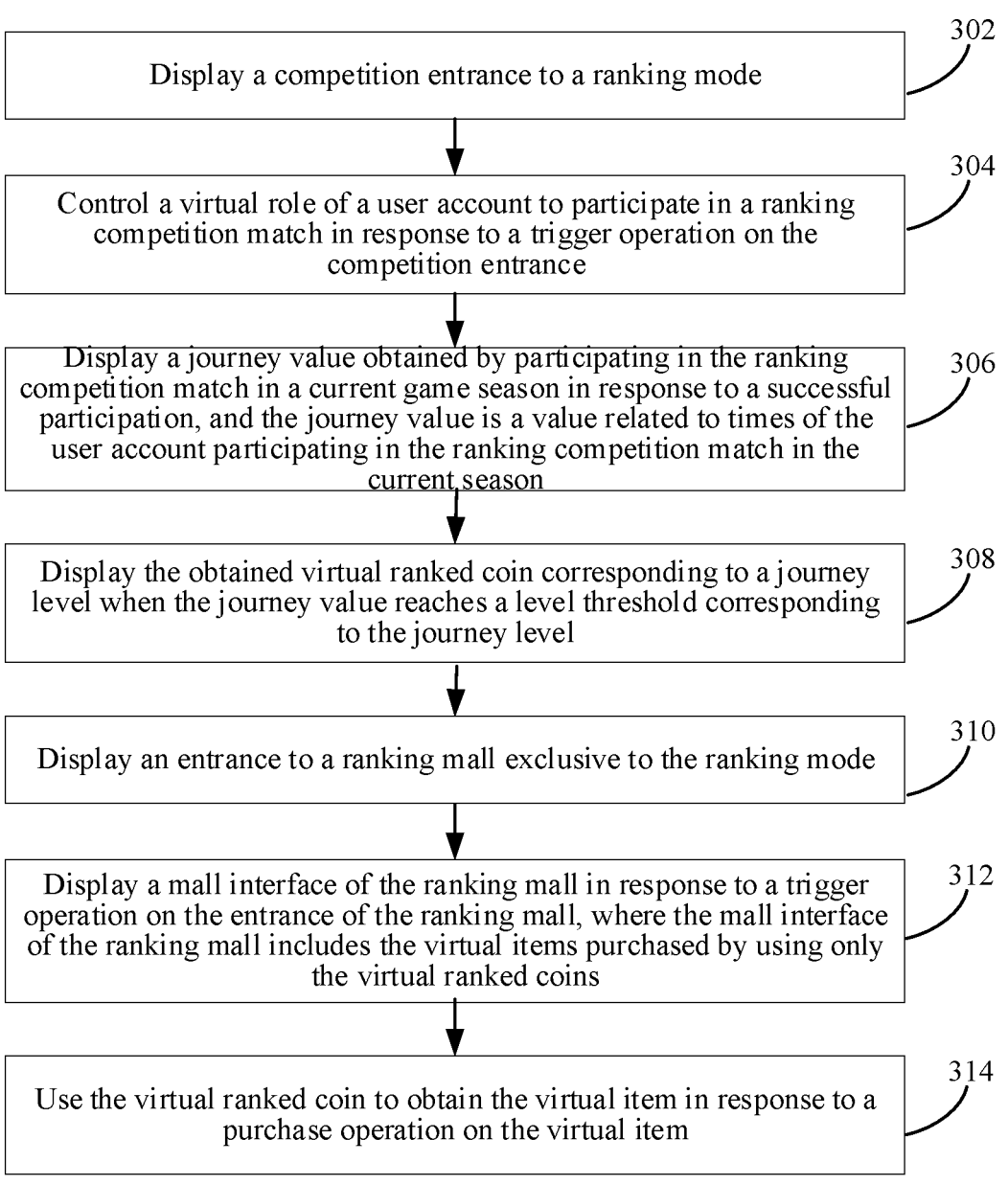

Display a competition entrance to a ranking mode — 302

Control a virtual role of a user account to participate in a ranking competition match in response to a trigger operation on the competition entrance — 304

Display a journey value obtained by participating in the ranking competition match in a current game season in response to a successful participation, and the journey value is a value related to times of the user account participating in the ranking competition match in the current season — 306

Display the obtained virtual ranked coin corresponding to a journey level when the journey value reaches a level threshold corresponding to the journey level — 308

Display an entrance to a ranking mall exclusive to the ranking mode — 310

Display a mall interface of the ranking mall in response to a trigger operation on the entrance of the ranking mall, where the mall interface of the ranking mall includes the virtual items purchased by using only the virtual ranked coins — 312

Use the virtual ranked coin to obtain the virtual item in response to a purchase operation on the virtual item — 314

FIG. 3

Control

6000

Glory Triumph

16000

Light of Rift

15000

Glory Gold, Baby

10000

Purchase Limit 0/15
Team Boost Card

200

Purchase Limit 0/1
Champion Selection
Chest

5500

1820

Display module

1840

Game module

1860

Reward module

1880

Mall module

METHOD, COMPUTER DEVICE, AND STORAGE MEDIUM FOR OBTAINING A VIRTUAL ITEM

CROSS-REFERENCES TO RELATED APPLICATIONS

This application is a continuation application of PCT Patent Application No. PCT/CN2022/127113, filed on Oct. 24, 2022, which claims priority to Chinese Patent Application No. 202111505067.7, filed on Dec. 10, 2021, all of which is incorporated herein by reference in their entirety.

FIELD OF THE TECHNOLOGY

Embodiments of the present disclosure relate to the field of virtual games, and in particular, to a method, an apparatus, a device, a medium, and a program product for obtaining a virtual item.

BACKGROUND OF THE DISCLOSURE

A battle arena game is a game in which a plurality of user accounts compete in a same virtual world. For example, the battle arena game may be a multiplayer online battle arena game (MOBA).

The MOBA games generally include a variety of games, such as a match game, a ranking game, a master challenge game, and an entertainment game. A user obtains a game gold coin by participating in various games, and purchase a virtual item, such as a champion, a skin, and a prop using the game gold coin.

However, there are some rare virtual items in the game mall that can only be obtained through a game lottery or by using a paid coupon, and it is difficult for an ordinary non-paid player to obtain these rare virtual items.

SUMMARY

One aspect of the present disclosure includes a method for obtaining a virtual item, performed by a computer device. The method includes displaying a competition entrance to a ranking mode, the ranking mode being one of at least two match modes provided by a client, and being a competition mode for determining a strength rank of a user account in a ranking list; controlling a virtual role of the user account to participate in a ranking competition match in response to a trigger operation on the competition entrance; displaying a virtual ranked coin obtained by participating in the ranking competition match in a current game season in response to a successful participation; and obtaining a virtual item exclusive to the ranking mode from a ranking mall exclusive to the ranking mode based on the virtual ranked coin.

Another aspect of the present disclosure includes a computer device. The computer device includes a processor and a memory. The memory stores at least one computer instruction, and the at least one computer instruction is loaded and executed by the processor to perform a method for obtaining a virtual item. The method includes displaying a competition entrance to a ranking mode, the ranking mode being one of at least two match modes provided by a client, and being a competition mode for determining a strength rank of a user account in a ranking list; controlling a virtual role of the user account to participate in a ranking competition match in response to a trigger operation on the competition entrance; displaying a virtual ranked coin obtained by participating in the ranking competition match in a current game season in response to a successful participation; and obtaining a virtual item exclusive to the ranking mode from a ranking mall exclusive to the ranking mode based on the virtual ranked coin.

Another aspect of the present disclosure includes a non-transitory computer readable storage medium for storing at least one computer instruction, the at least one computer instruction being loaded and executed by a processor to perform a method for obtaining a virtual item. The method includes displaying a competition entrance to a ranking mode, the ranking mode being one of at least two match modes provided by a client, and being a competition mode for determining a strength rank of a user account in a ranking list; controlling a virtual role of the user account to participate in a ranking competition match in response to a trigger operation on the competition entrance; displaying a virtual ranked coin obtained by participating in the ranking competition match in a current game season in response to a successful participation; and obtaining a virtual item exclusive to the ranking mode from a ranking mall exclusive to the ranking mode based on the virtual ranked coin.

By providing the virtual ranked coin, the ranking mall, and the virtual item exclusive to the ranking mode, a user can obtain or purchase a rare virtual item of the game season by participating in the ranking competition match, thereby increasing ways for the user to obtain the rare virtual item, promoting the user to participate in the ranking competition match, and contributing to improving a resource utilization rate of a server for providing the ranking competition match.

BRIEF DESCRIPTION OF THE DRAWINGS

FIG. 3 is a flowchart of a method for obtaining a virtual item according to an exemplary embodiment of the present disclosure;

DESCRIPTION OF EMBODIMENTS

Figure 1:
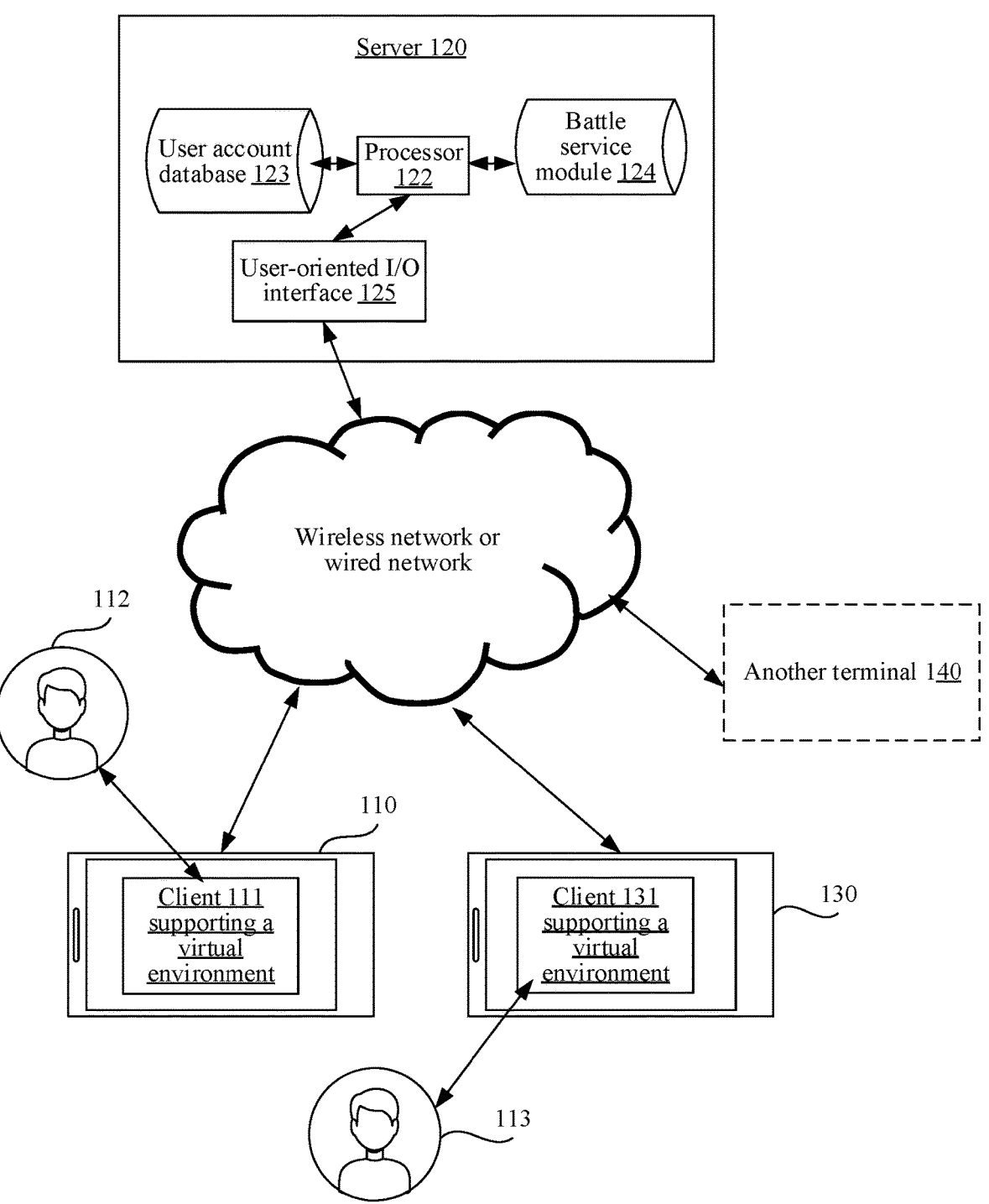
FIG. 1 is a structural block diagram of a computer system according to an exemplary embodiment of the present disclosure.

To make the objectives, technical solutions, and advantages of the present disclosure clearer, the following further describes implementations of the present disclosure in detail with reference to the accompanying drawings.

Terms involved in the embodiments of the present disclosure are described as follows.

The term "virtual environment" includes a displayed (or provided) virtual environment when an application runs on a terminal. The virtual environment may be a simulated world of a real world, or may be a semi-simulated and semi-fictional three-dimensional world, or may be a completely fictional three-dimensional world. The virtual environment may be any one of a two-dimensional virtual environment, a two-and-a-half-dimensional virtual environment, or a three-dimensional virtual environment. In one embodiment, the virtual environment is also used for a virtual environment battle between at least two virtual roles, with a virtual resource available to the at least two virtual roles in the virtual environment. In one embodiment, the virtual environment includes a symmetrical lower left corner area and an upper right corner area, in which virtual roles belonging to two opposing camps occupy one area thereof respectively, and destroy a target building/fort/base/crystal deep in each other's area as a victory goal.

The term "virtual role" includes a movable object in a virtual environment. The movable object may be at least one of a virtual role, a virtual animal, or a cartoon character. In one embodiment, when the virtual environment is a three-dimensional virtual environment, the virtual role may be a three-dimensional virtual model, and has its own shape and volume in the three-dimensional virtual environment and occupies a part of spaces in the three-dimensional virtual environment. In one embodiment, the virtual role is a three-dimensional role constructed based on three-dimensional human skeleton technologies, and wears different skins to implement different appearances. In some implementations, the virtual role may also be implemented through a two-and-half-dimensional or a two-dimensional model. This is not limited in the embodiments of the present disclosure.

The term "multiplayer online battle arena" means that in a virtual environment, different virtual teams belonging to at least two opposing camps occupy their own map areas and compete with a certain victory condition as a goal. The victory condition includes, but are not limited to: occupying a fort or destroying a fort of the opposing camps, killing virtual roles of the opposing camps, ensuring survival within a specified scene and time, seizing a specific resource, or outscoring at least one of opponents within a specified time. A battle arena may take place in rounds, and each round of the battle arena may have a same map or different maps. Each virtual team includes one or more virtual roles, such as 1, 2, 3, or 5.

The term "MOBA game" is a game in which several forts are provided in a virtual environment, and users in opposing camps control virtual roles to battle in the virtual environment, occupy forts or destroy the forts of the opposing camps. For example, in the MOBA game, users may be divided into two opposing camps, the virtual roles controlled by the users are scattered in the virtual environment to compete with each other, and destroying or occupying all enemy forts is used as a condition for victory. The MOBA game takes place in rounds, and a duration time of one round of the MOBA game is from a moment at which the game starts to a moment at which the victory condition is satisfied.

FIG. 1 is a structural block diagram of a computer system provided according to an exemplary embodiment of the present disclosure. The computer system 100 includes a first terminal 110, a server 120, and a second terminal 130.

A client 111 supporting a virtual environment is installed on and run by the first terminal 110, and the client 111 may be a multiplayer online battle program. When the first terminal 110 runs the client 111, a user interface of the client 111 is displayed on a screen of the first terminal 110. The client 111 may be any one of an escape shooting game, a virtual reality (VR) application, an augmented reality (AR) program, a three-dimensional map program, a virtual reality game, an augmented reality game, a first-person shooting game (FPS), a third-person shooting game (TPS), multiplayer online battle arena games (MOBA), or a simulation game (SLG). In this embodiment, an example in which the client 111 is the MOBA game is used for description. The first terminal 110 is a terminal used by a first user 112. The first user 112 uses the first terminal 110 to control a first virtual role located in the virtual environment to perform activities, and the first virtual role may be referred to as a master virtual role of the first user 112. The activities of the first virtual role include but are not limited to at least one of moving, jumping, teleporting, casting a skill, adjusting body postures, crawling, walking, running, riding, flying, jumping, driving, picking, shooting, attacking, or throwing. For example, the first virtual role is a first virtual role, such as a simulated character role or a cartoon character role.

A client 131 supporting a virtual environment is installed on and run by a second terminal 130, and the client 131 may be a multiplayer online battle program. When the second terminal 130 runs the client 131, a user interface of the client 131 is displayed on a screen of the second terminal 130. The client may be any one of an escape shooting game, a VR application, an AR program, a three-dimensional map program, a virtual reality game, an augmented reality game, an FPS, a TPS, MOBA, or an SLG. In this embodiment, an example in which the client is the MOBA game is used for description. The second terminal 130 is a terminal used by a second user 113. The second user 113 uses the second terminal 130 to control a second virtual role located in the virtual environment to perform activities, and the second virtual role may be referred to as a master virtual role of the second user 113. For example, the second virtual role is a second virtual role, such as a simulated character role or a cartoon character role.

In one embodiment, the first virtual role and the second virtual role are located in a same virtual environment. In one embodiment, the first virtual role and the second virtual role belong to a same camp, a same team, or a same organization, have a friend relationship with each other, or have a temporary communication permission. In one embodiment, the first virtual role and the second virtual role may belong to different camps, different teams, different organizations, or have an adversarial relationship with each other.

In one embodiment, the clients installed on the first terminal 110 and the second terminal 130 are the same, or the clients installed on the two terminals are clients of a same type on different operating system platforms (such as Android or IOS). The first terminal 110 may generally refer to one of a plurality of terminals, and the second terminal 130 may generally refer to another one of the plurality of terminals. In this embodiment, the first terminal 110 and the second terminal 130 are merely used as an example for description. Device types of the first terminal 110 and the second terminal 130 are the same or different. The device type includes at least one of a smartphone, a tablet computer, an e-book reader, an MP3 player, an MP4 player, a laptop portable computer, or a desktop computer.

FIG. 1 shows only two terminals. However, a plurality of other 140 terminals may access the server 120 in different embodiments. In one embodiment, one or more terminals 140 are terminals corresponding to a developer. A developing and editing platform for the client supporting a virtual environment is installed on the terminal 140. The developer may edit and update the client on the terminal 140 and transmit an updated client software package to the server 120 by using a wired or wireless network. The first terminal 110 and the second terminal 130 may download the client software package from the server 120 to update the client.

The first terminal 110, the second terminal 130, and the another terminal 140 are connected to the server 120 through a wireless network or a wired network.

The server 120 includes at least one of a server, a plurality of servers, a cloud computing platform, or a virtualization center. The server 120 is configured to provide a background service for a client supporting a three-dimensional virtual environment. In one embodiment, the server 120 is responsible for primary computing work, and the terminal is responsible for secondary computing work; Alternatively, the server 120 is responsible for secondary computing work, and the terminal is responsible for primary computing work; Alternatively, a distributed computing architecture is adopted between the server 120 and the terminal to perform collaborative computing.

In one example, the server 120 includes a processor 122, a user account database 123, a battle service module 124, and a user-oriented input/output (I/O) interface 125. The processor 122 is configured to load instructions stored in the server 121 and process data in the user account database 123 and the battle service module 124. The user account database 123 is configured to store data of a user account used by the first terminal 110, the second terminal 130 and the another terminal 140, for example, an avatar of the user account, a nickname of the user account, a battle effectiveness index of the user account, and a service zone of the user account. The battle service module 124 is configured to provide a plurality of battle rooms for a user to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

Figure 2:
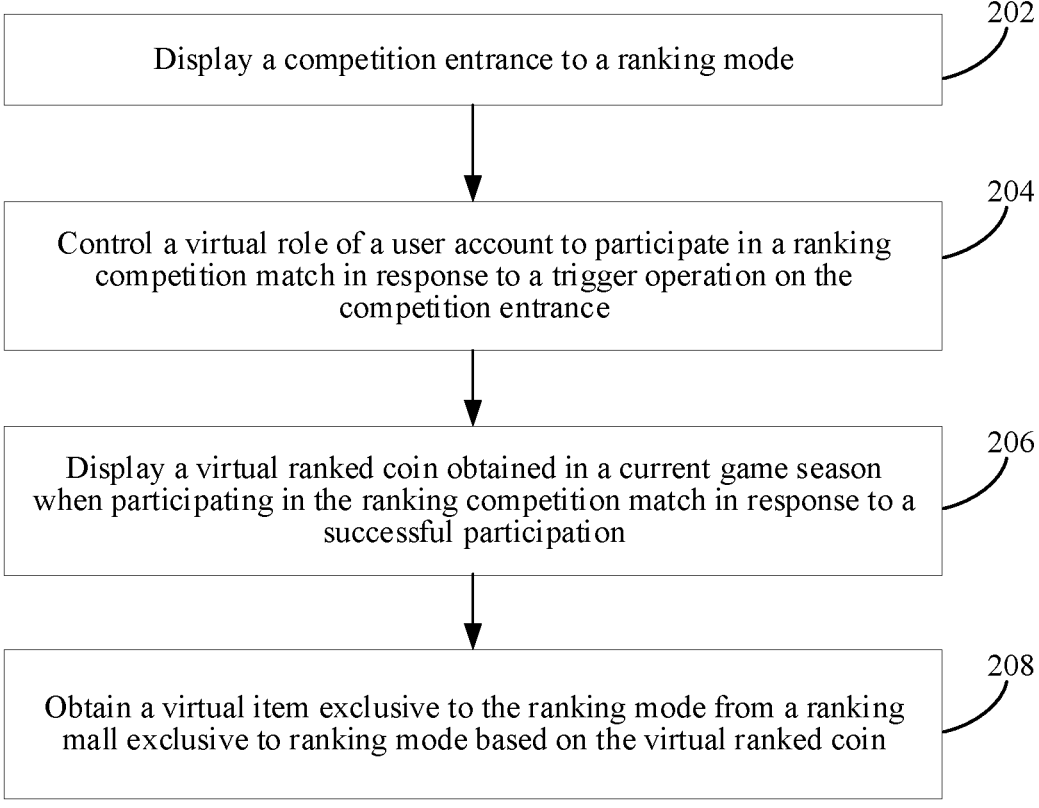
FIG. 2 is a flowchart of a method for obtaining a virtual item according to an exemplary embodiment of the present disclosure.

FIG. 2 is a flowchart of a method for obtaining a virtual item according to an exemplary embodiment of the present disclosure. This embodiment is described by using an example in which the method is applied in the terminal shown in FIG. 1. The method includes:

Step 202: Display a competition entrance to a ranking mode.

The ranking mode is one of at least two match modes provided by a client, and the ranking mode is a competition mode for determining a strength rank of a user account in a ranking list.

In one embodiment, the match mode provided by the client includes at least one of a matchmaking game, a ranking competition, a master challenge game, or a recreational game. This is not limited in the embodiments of the present disclosure.

The competition entrance to the ranking mode is an interface entrance for participating in the ranking competition, or an entrance for matchmaking for participating in the ranking competition. The competition entrance may be a button, a link, or a menu item on a user interface. A specific form of the competition entrance is not limited in the present disclosure.

Step 204: Control a virtual role of the user account to participate in a ranking competition match in response to a trigger operation on the competition entrance.

The trigger operation may be at least one of a single-click operation, a double-click operation, a long press operation, a slide operation, a pressure touch operation, a suspension touch operation, a double-eye stare operation, a gesture operation, or a motion sensing operation.

For example, by triggering the competition entrance to the ranking competition, a user can control the virtual role of the user account to participate in the ranking competition match in the ranking mode.

In one embodiment, the user account has one or more virtual roles, and ownership of the virtual role is permanent or of a short-term experience nature. After triggering the competition entrance to the ranking competition, the user can control one of the virtual roles of the user account to participate in the ranking competition match. Different virtual roles may have different skills or attributes.

Step 206: Display a virtual ranked coin obtained in a current game season when participating in the ranking competition match in response to successful participation.

The virtual ranked coin is a virtual currency exclusive to the ranking mode. In one embodiment, the client is provided with a gold coin system, and the user can obtain an ordinary gold coin by participating in the matchmaking game, the recreational game, a punch-in task, a lottery task, or the like in the client. The ordinary gold coin is a virtual coin applicable for a plurality of conventional modes. Different from the ordinary gold coin, the virtual ranked coin is a virtual currency that can only be obtained when participating in the ranking mode, and cannot be obtained in a non-ranking mode.

The client controls the virtual role of the user account to participate in the ranking competition match, and obtains the virtual ranked coin when the virtual role successfully participates in a single ranking competition match.

In some embodiments, the user can obtain the virtual ranked coin provided that the user successfully participates in the ranking competition match. In some other embodiments, after the user successfully participates in the ranking competition match, a single-game journey value obtained by the user account for participating in the ranking competition match in a current game season is displayed. When a total journey value reaches a level threshold, an obtained journey-exclusive reward corresponding to the level threshold is displayed. In one embodiment, the journey-exclusive reward corresponding to the level threshold includes at least one of a virtual ranked coin, a virtual game season badge, or a virtual appearance reward. There may be a plurality of the level thresholds, for example, a first level threshold, a second level threshold, and a third level threshold. The third level threshold is greater than the second level threshold, and the second level threshold is greater than the first level threshold.

In some embodiments, the virtual ranked coin is obtained when the ranking competition match is successfully participated and is normally ended, and the virtual role of the user account does not involve misbehavior during the match. If the ranking competition match ends abnormally (for example, the match ends too fast or the match crashes) or the virtual role of the user account involves misbehavior during the match (for example, the virtual role is away from keyboard, publishes unauthorized messages, or plays passively), the virtual ranked coin cannot be obtained.

Step 208: Obtain a virtual item exclusive to the ranking mode from a ranking mall exclusive to ranking mode based on the virtual ranked coin.

In some embodiments, the virtual item exclusive to the ranking mode can only be obtained by using a virtual ranked coin in exchange, and cannot be obtained by using another virtual currency or virtual coupon with an exchange attribute.

The virtual item exclusive to ranking mode is not limited to be used in the ranking mode. In some embodiments, the virtual item exclusive to the ranking mode may be used in various match modes provided by the client. For example, a skin of the virtual role obtained based on the virtual ranked coin may be used in the matchmaking game, the ranking competition, the master challenge game, and the recreational game.

The ranking mall is a mall exclusive to the ranking mode. The virtual item in the ranking mall needs to be paid and purchased with the virtual ranked coin. All the virtual items in the ranking mall are the virtual items exclusive to the ranking mode, or some of the virtual items in the ranking mall are exclusive to the ranking mode.

In one embodiment, the client is provided with an ordinary mall. The virtual item in the ordinary mall is paid and purchased with the ordinary gold coin. Different from the ordinary mall, the virtual items in the ranking mall need to be paid and purchased with the virtual ranked coin.

In conclusion, in the method provided in the embodiments of the present disclosure, by providing the virtual ranked coin, the ranking mall, and the virtual item exclusive to the ranking mode, the user can obtain or purchase a rare virtual item of the game season by participating in the ranking competition match, thereby increasing ways for the user to obtain the rare virtual item, promoting the user to participate in the ranking competition match, and contributing to improving a resource utilization rate of a server for providing the ranking competition match.

FIG. 3 is a flowchart of a method for obtaining a virtual item provided according to an exemplary embodiment of the present disclosure. This embodiment is described by using an example in which the method is applied in the terminal shown in FIG. 1. The method includes:

Step 302: Display a competition entrance to a ranking mode, where the ranking mode is one of at least two match modes provided by a client, and the ranking mode is a competition mode for determining a strength rank of a user account in a ranking list.

The ranking mode is one of at least two match modes provided by the client, and the ranking mode is the competition mode for determining the strength rank of the user account in the ranking list. The ranking list may be a national ranking list, a cross-platform ranking list, a cross-server ranking list, a server ranking list of a current server, or the like. The strength rank is a representation used to measure competitive power of the user account, and is usually represented by at least two ranks from low to high. For example, a ranking competition has 10 ranks from low to high: iron, bronze, silver, gold, platinum, emerald, diamond, master, grand master, and challenger.

In one embodiment, the match mode provided by the client includes at least one of a matchmaking game, a ranking competition, a master challenge game, or a recreational game. This is not limited in the embodiments of the present disclosure. The client may be a client of an MOBA game, a shooting game, a fighting game, or the like. A program type of the client is not limited in the embodiments of the present disclosure.

Step 304: Control a virtual role of the user account to participate in a ranking competition match in response to a trigger operation on the competition entrance.

For the implementation of this step, reference may be made to step 204, and details are not repeated in this embodiment.

Step 306: Display a journey value obtained by participating in the ranking competition match in a current game season in response to successful participation, and the journey value is a value related to times for which the user account participates in the ranking competition match in the current game season.

After the user successfully participates in the ranking competition match, a single-match journey value obtained by the user account in the current game season due to participating in the single-match ranking competition, or an accumulated journey value obtained by the user account in the current game season due to participating in the ranking competition match is displayed.

When the accumulated journey value reaches a level threshold, an obtained journey-exclusive reward corresponding to the level threshold is displayed. In one embodiment, the journey-exclusive reward corresponding to the level threshold includes at least one of a virtual ranked coin, a virtual game season badge, or a virtual appearance reward. There may be a plurality of level thresholds, for example, a first level threshold, a second level threshold, and a third level threshold. The third level threshold is greater than the second level threshold, and the second level threshold is greater than the first level threshold.

Figure 4:
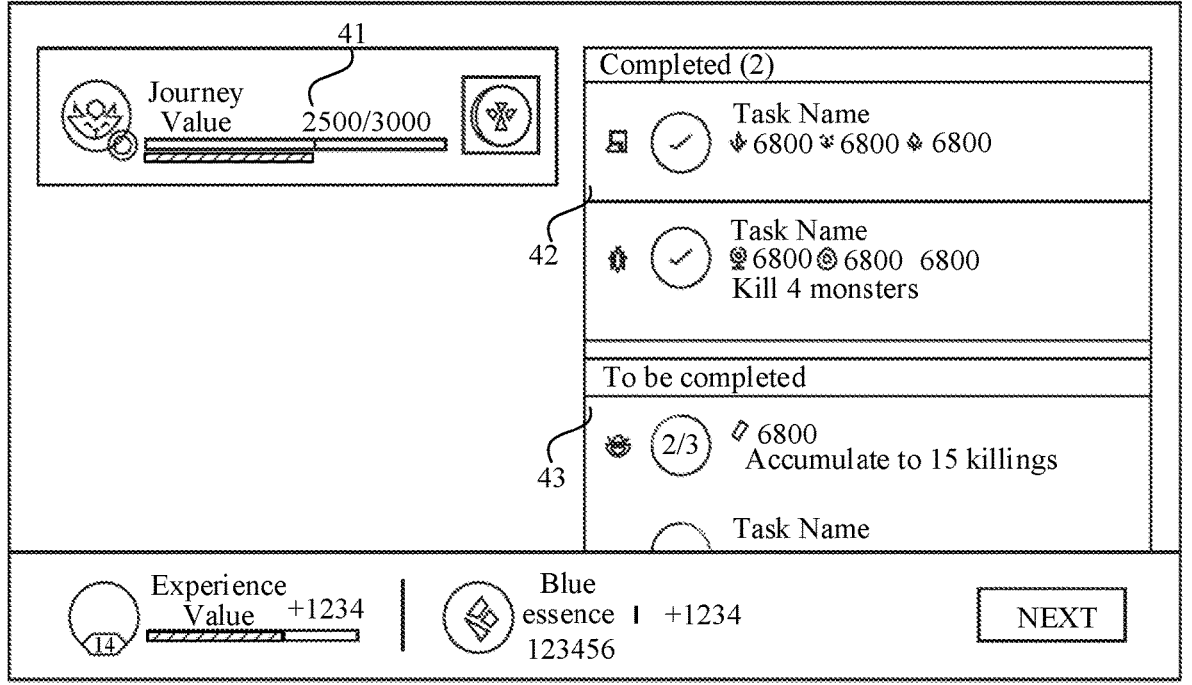
FIG. 4 is a schematic diagram of a game season journey interface according to an exemplary embodiment of the present disclosure.

As shown in FIG. 4, when the virtual role successfully participates in at least one ranking competition match in the ranking mode, an accumulated journey value 41 (2500) obtained by participating in the at least one ranking competition match in the ranking mode in the current game season is displayed on a left side of a settlement interface, and a received journey-exclusive reward 42 and a to-be-received journey-exclusive reward 43 in the current game season are displayed on a right side of the settlement interface 40.

At a bottom of the settlement interface, there are also experience values "+11234" and blue essence "+1234" that are earned after this match. The settlement interface is an interface for settling an outcome of the ranking competition match at the end of the ranking competition match in which the virtual role participates.

In one embodiment, the journey value is not only related to the times of the ranking competition match, but also related to an outcome of the ranking competition match participated in.

In some embodiments, when the user account participates in and wins a single ranking competition match, a first quantity of the journey value obtained by participating in the single ranking competition match in the current game season is displayed; when the user account participates in and loses the single ranking competition match, a second quantity of the journey value obtained in the current game season by participating in the single ranking competition match is displayed, and the first quantity is greater than or equal to the second quantity.

For example, when the client controls the virtual role of the user account to participate in the ranking competition match, and when the virtual role wins a single ranking competition match, a journey value earned by the user account in the current game season is 30; or when the virtual role loses a single ranking competition match, a journey value earned by the user account in the current game season is 20.

In one embodiment, the journey value is also related to a time period in which the ranking competition match takes place. For example, a journey value obtained by participating in the ranking competition match within a specified time period is greater than a journey value obtained by participating in the ranking competition match within a regular time period.

In some embodiments, a hidden score is determined based on the ranking competition match that the user account successfully participates in within the regular time period, and the regular time period is a time period in the current game season other than the specified time period. A quantity n of bonus sessions is determined based on the hidden score. When the user account successfully participates in first n ranking competition matches within the specified time period, a bonus journey value obtained by participating in the ranking competition match within the specified time period is displayed. The bonus journey value is greater than the single-match journey value obtained by the virtual role within the regular time period.

For example, when the user account successfully participates in the ranking competition match within the specified time period of the current game season, where the specified time period may be set as a weekend, the virtual role may obtain 1.5 times the journey value by participating in the first n ranking competition matches during the weekend in the current game season. The journey value of the ranking competition match after the first n ranking competition matches during the weekend in the current game season is the same as the single-match journey value within the regular time period.

In some embodiments, there is a positive correlation between the quantity of bonus sessions and the hidden score, so as to encourage the user to participate in the ranking competition more within the regular time period to increase the hidden score and further increase the quantity of bonus sessions.

When the user account participates in the ranking competition match within the regular time period and wins the ranking competition match, a third quantity of the hidden scores is determined; or when the user account participates in the ranking competition match within the regular time period and loses in the ranking competition match, a fourth quantity of the hidden scores is determined, where the third quantity is less than the fourth quantity.

Certainly, in other exemplary embodiments, the third quantity may be greater than the fourth quantity. This is not limited in this embodiment.

The hidden score is a point determined based on performance of the virtual role in the ranking competition match within the regular time period, and the point is not displayed on a user interface. For example, setting of the hidden score in the ranking competition match is shown in Table 1.

TABLE 1

| Performance of the virtual role | Point |
|---|---|
| Win one ranking competition match | 5 |
| Lose one ranking competition match | 15 |
| Promoted to a higher rank | −30 |
| Login bonus point | 10/day |

For example, the ranking competition is used as an example. By participating in the ranking competition match within the regular time period, the virtual role can obtain 5 hidden scores for each ranking competition match won and can obtain 15 hidden scores for each ranking competition match lost within the regular time period. The virtual role may lose 30 hidden scores for each promotion in the ranking competition match. At the same time, the virtual role may obtain 10 hidden scores by participating in the ranking competition match for the first time every day within the regular time period. For example, when the hidden scores of the user account exceed 30 points, a ranking competition match with the bonus journey value may be obtained.

Certainly, in other embodiments, the journey value is also related to in-match performance of the ranking competition match. For example, there is a positive correlation between the journey value and a match score of the ranking competition match. A higher match score indicates better match performance of the virtual role. This is not limited in the embodiments of the present disclosure.

Step 308: Display an obtained virtual ranked coin corresponding to a journey level when the journey value reaches a level threshold corresponding to the journey level.

When the accumulated journey value reaches the level threshold corresponding to the journey level, the obtained journey-exclusive reward corresponding to the journey level is displayed. In one embodiment, the journey-exclusive reward corresponding to the journey level includes at least one of the virtual ranked coin, the virtual game season badge, and the virtual appearance reward. There may be a plurality of level thresholds, for example, the first level threshold, the second level threshold, and the third level threshold. The third level threshold is greater than the second level threshold, and the second level threshold is greater than the first level threshold.

In one embodiment, a level threshold corresponding to a high journey level is greater than a level threshold corresponding to a low journey level. Total value of a high journey-exclusive reward is also greater than total value of a low journey-exclusive reward.

Step 310: Display an entrance to a ranking mall exclusive to the ranking mode.

The ranking mall is a mall exclusive to the ranking mode. The virtual item in the ranking mall needs to be paid and purchased with the virtual ranked coin. All the virtual items in the ranking mall are the virtual items exclusive to the ranking mode, or some of the virtual items in the ranking mall are exclusive to the ranking mode.

Figure 5:
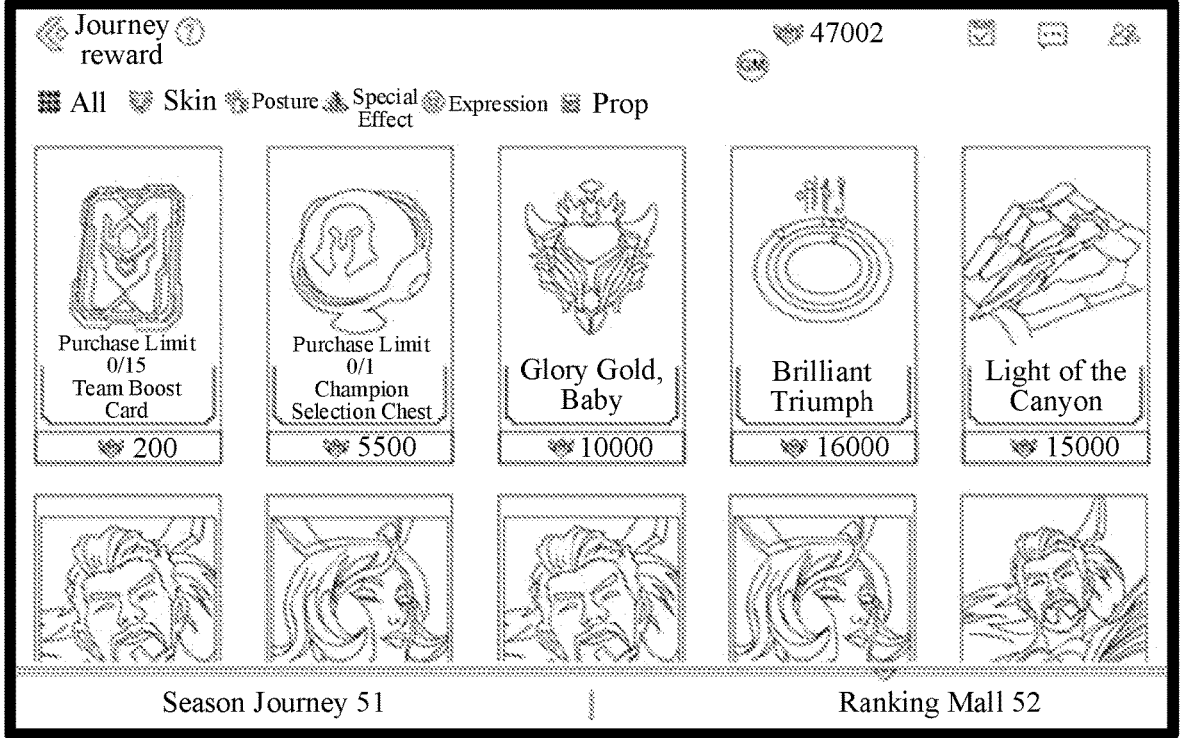
FIG. 5 is a schematic diagram of an interface of a ranking mall according to an exemplary embodiment of the present disclosure.

As shown in FIG. 5, there are two tabs displayed on a game season journey page of the client: a game season journey 51 and a ranking mall 52. The game season journey 51 is a tab used to view the journey value and reward of the current game season; The ranking mall 52 is a tab used to view each virtual item in the ranking mall.

One or more virtual items are displayed on the tab of the ranking mall 52 in response to a trigger operation of the user clicking on the ranking mall 52. A classification of these virtual items includes but is not limited to at least one of a virtual skin, a virtual posture, a virtual special effect, a virtual expression, or a virtual prop.

Figure 6:
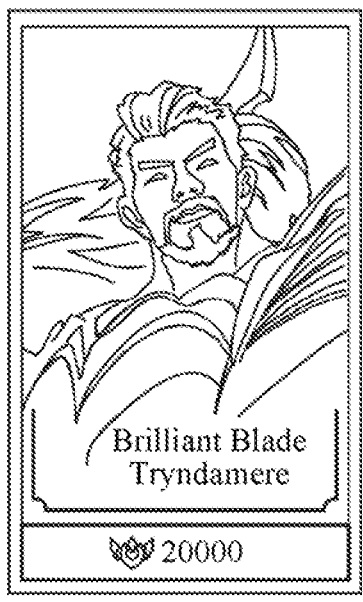
FIG. 6 is a schematic diagram of a virtual skin according to an exemplary embodiment of the present disclosure.

The virtual skin is a virtual display element worn on a three-dimensional model of a virtual role, and the virtual skin can change appearance of the virtual role. As shown in FIG. 6, a virtual skin "S1 Game Season Skin Brilliant Blade" is a game-season-exclusive skin of a virtual role "Tryndamere", and a price is 20000 ranked coins.

Figure 7:
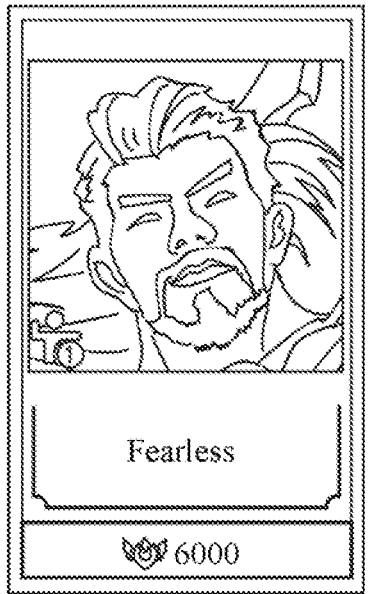
FIG. 7 is a schematic diagram of a virtual posture according to an exemplary embodiment of the present disclosure.
Figure 8:
FIG. 8 is a schematic diagram of a virtual posture according to an exemplary embodiment of the present disclosure.

The virtual posture is a virtual display element that controls a virtual role to make a certain posture. As shown in FIG. 7, the virtual posture "Fearless" is a virtual posture of the virtual role "Tryndamere", and the price is 6000 ranked coins; As shown in FIG. 8, a virtual posture "Control" is a virtual posture of a virtual role "Orianna", and a price is 6000 ranked coins.

Figure 9:
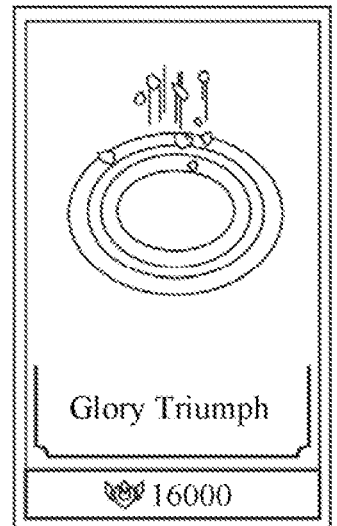
FIG. 9 is a schematic diagram of a virtual recalling special effect according to an exemplary embodiment of the present disclosure.
Figure 10:
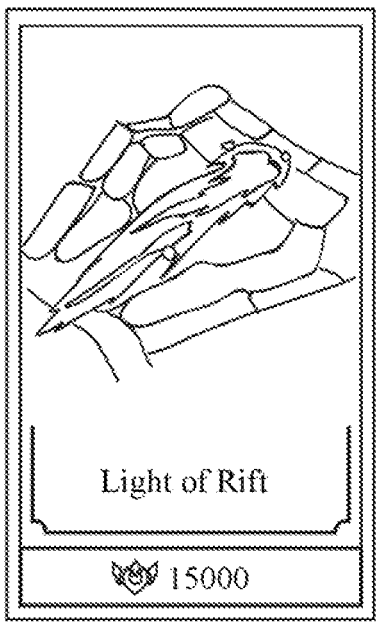
FIG. 10 is a schematic diagram of a virtual decorative special effect according to an exemplary embodiment of the present disclosure.

The virtual special effect is a cartoon special effect displayed when a virtual role is controlled to perform triggering activities such as moving, recalling, and using skills. As shown in FIG. 9, a virtual recalling special effect "Glory Triumph" is priced at 16000 ranked coins. As shown in FIG. 10, a virtual decorative special effect "Light of Rift" is priced at 15000 ranked coins.

Figure 11:
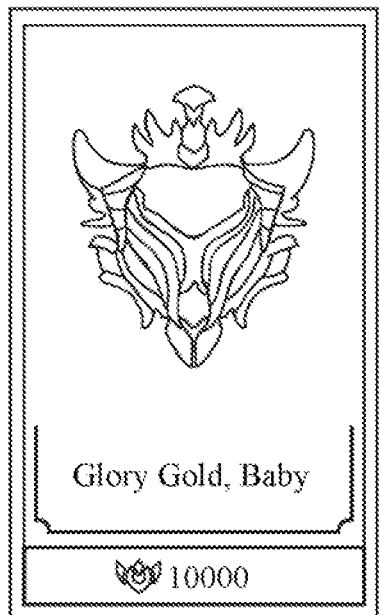
FIG. 11 is a schematic diagram of a virtual decorative expression according to an exemplary embodiment of the present disclosure.

The virtual expression is a two-dimensional or three-dimensional expression meme displayed on a top of a virtual role's head after being triggered. As shown in FIG. 11, a virtual expression "Glory Gold, Baby!" is a ranked badge expression compatible with a player's rank, and a price is 10000 ranked coins.

Figure 12:
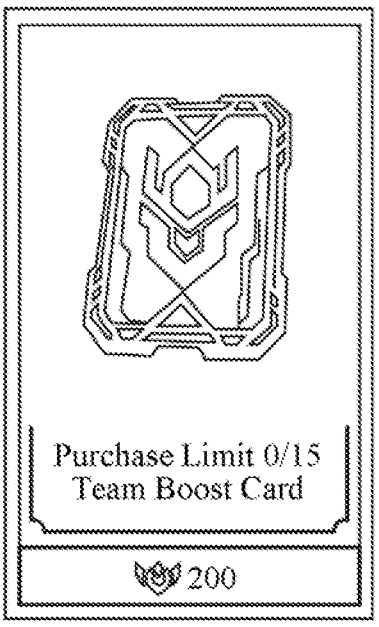
FIG. 12 is a schematic diagram of a virtual prop according to an exemplary embodiment of the present disclosure.
Figure 13:
FIG. 13 is a schematic diagram of a virtual prop according to an exemplary embodiment of the present disclosure.

The virtual prop is a prop used to change an attribute value, a skill, and/or an ability of the virtual role. As shown in FIG. 12, a purchase limit of a virtual prop "Team Boost Card" is 15 per game season, and a price of each is 200 ranked coins. As shown in FIG. 13, a purchase limit of a virtual prop "Champion Selection Chest" is 1 per game season, and a price of each is 5500 ranked coins.

For example, display positions and use occasions of different types of the virtual items after being purchased are shown in Table 2 below.

TABLE 2

| Item type | Display position | Use occasion |
| --- | --- | --- |
| Virtual skin | Collection system | Champion selection interface, in-match battlefield, or the like |
| Virtual posture | Collection system | High polygon model display area of the champion selection interface |
| Virtual special effect | Collection system | In-match battlefield |
| Virtual expression | Collection system | In-match battlefield |
| Virtual prop | Backpack | Backpack |

Step 312: Display an ranking mall interface in response to a trigger operation on the entrance to the ranking mall, where the ranking mall interface includes virtual items to be purchased by using only the virtual ranked coins.

The ranking mall is a mall exclusive to the ranking mode. The virtual item in the ranking mall needs to be paid and purchased with the virtual ranked coin. All the virtual items in the ranking mall are the virtual items exclusive to the ranking mode, or some of the virtual items in the ranking mall are exclusive to the ranking mode.

In one embodiment, the client is provided with an ordinary mall. A virtual item in the ordinary mall is paid and purchased with an ordinary gold coin. Different from the ordinary mall, the virtual items in the ranking mall need to be paid and purchased with the virtual ranked coin.

In some embodiments, the client obtains a game season virtual item exclusive to the current game season. The game season virtual item includes at least one of a virtual skin, a virtual posture, a virtual special effect, a virtual expression, and a virtual prop used by a virtual role. Based on the game season virtual item exclusive to the current game season, the ranking mall interface is displayed.

Figure 14:
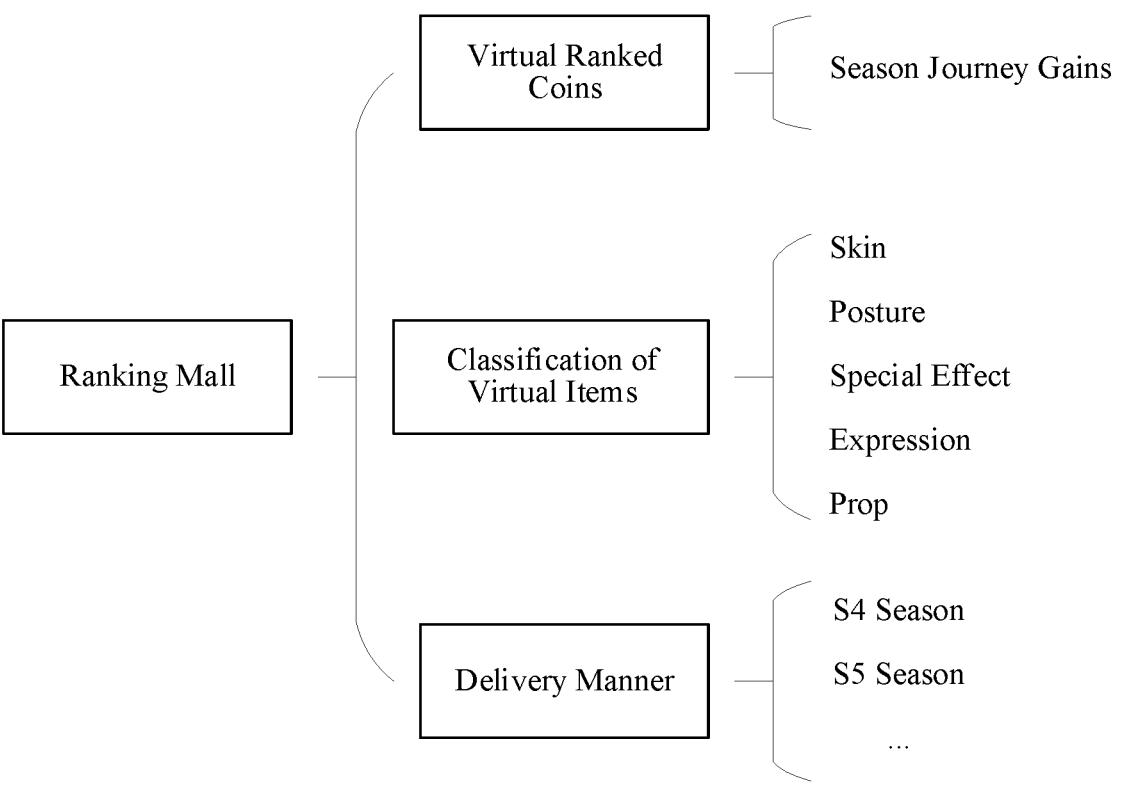
FIG. 14 is a schematic diagram of a design of a ranking mall according to an exemplary embodiment of the present disclosure.

As shown in FIG. 14, assuming that the current game season is the S4 game season, a game season virtual item exclusive to S4 game season will be released in the current game season. Assuming that the current game season is the S5 game season, the game season virtual item exclusive to the S5 game season will be released in the current game season.

In some embodiments, the client obtains a level virtual item with a purchase privilege based on a journey level of the user account, where the level virtual item includes at least one of a virtual skin, a virtual posture, a virtual special effect, a virtual expression, and a virtual prop used by the virtual role. The ranking mall interface is displayed based on the level virtual item.

For example, purchase privileges of different virtual items can be unlocked when different journey levels are reached. A virtual item that can be purchased at the high journey level can be of better quality than a virtual item that can be purchased at the low journey level.

Step 314: Use the virtual ranked coin to obtain the virtual item in response to a purchase operation on the virtual item.

In this embodiment, by setting the bonus journey value for the ranking competition match within the specified time period, the user is encouraged to participate in the ranking competition match within the specified time period, which is helpful to improve a resource utilization rate of a server of the ranking competition match within the specified time period. In addition, by setting that the hidden score can be obtained by participating in the ranking competition match within the regular time period and that the quantity of bonus matches is obtained based on the hidden score, the user is encouraged to participate in the match within the regular time period, which is helpful to improve the resource utilization rate of the server of the ranking competition match within the regular time period.

Figure 15:
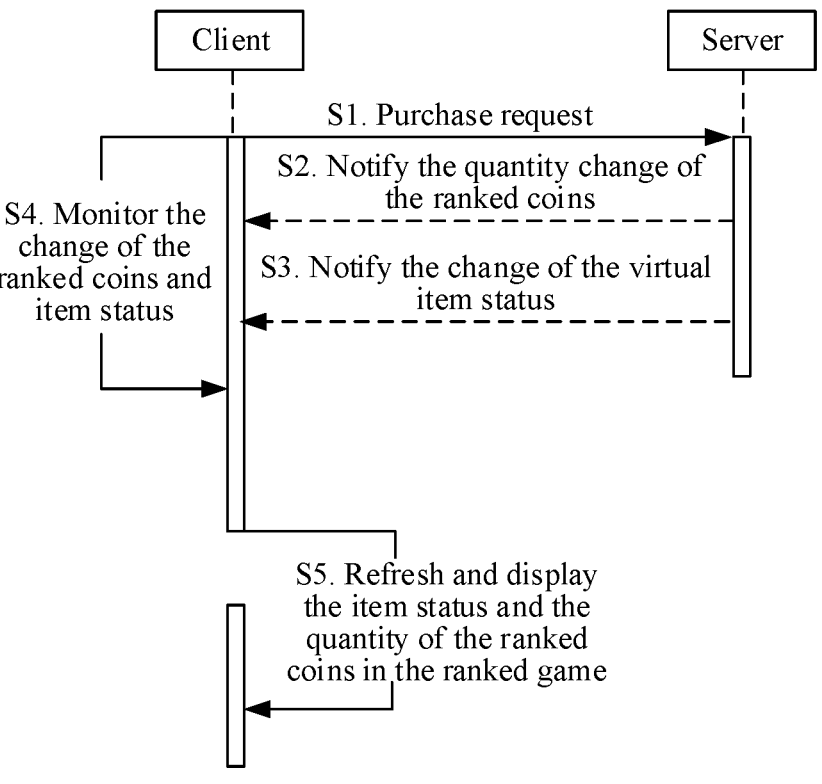
FIG. 15 is a flowchart of a method for obtaining a virtual item according to an exemplary embodiment of the present disclosure.

FIG. 15 illustrates a flowchart of a purchase process of a ranked virtual item according to an exemplary embodiment of the present disclosure. In this embodiment, an example in which the method is applied in the client and the server is mainly used for description. The method includes:

S1: The client sends a purchase request of a virtual item to the server;

The client sends detailed information of the virtual item, and the server verifies detailed field data through an item table to determine whether the purchase is successful.

In one embodiment, when a user purchases the virtual item, it is necessary to send an item price currently displayed by the client, so as to prevent inconsistency between the item price value displayed by the client and the actual item price value of the server, resulting in a poor experience of the user.

When the two values are inconsistent, the user can be prompted by a feedback that the purchase is unsuccessful (to be modified to return a correct price of the client).

In one embodiment, when the user purchases a gift package item:

Drop all gift packages (all configuration items are dropped)—An actual price of the gift package needs to be calculated (the actual price can be obtained by deducting the price of the items already owned by the player according to a price percentage of each dropped item configured in the item table).

Random gift packages (the configuration items are dropped randomly)—coins are deducted according to the gift package price. When gift package items are opened, if the items owned by the player are randomly selected, a replacement scheme is performed.

For example, a purchase type of ranked coin is added to a front-end web page displayed by the client. A code is as follows:

```
Public enum ENUM_COMMODITY_BUYWAY_TYPE
{
COWODITY_BUYWAY_TYPE_GOLD = 1,//Ordinary gold coin purchase
COWODITY_BUYWAY_TYPE_DIAMOND = 2,//Diamond purchase
COWODITY_BUYWAY_TYPE_MONEY = 3,//Coupon purchase
COWODITY_BUYWAY_TYPE_QUALIFY_COIN = 4,//Ranked coin purchase
```

Buy a multiplex store protocol CS_CMD_BUY_COM-MODITY to send a purchase request.

```
< struct name= "CSBuyCommodity" version= "1" desc= "Buy commodity" >
< entry id = "2" name= "BuyCommodityList" type= "commodityItem" refer= "Num"
count= "MAC BUY COMMODITY NUM" desc= "Buy commodity list" >
```

When requesting purchase, the BuyWay field in CommodityItem is filled with the ranked coin purchase defined above.

```
< struct name= "CommodityItem" version= "1" desc= "buy an item" >
< entry id = "1" name= "ID" type= "int32" desc= "item ID" >
< entry id = "2" name= "Price" type= "int32" desc= "item price" >
< entry id = "3" name= "Mum" type= "int32" desc= "quantity" >
< entry id = "4" name= "Buy Way" type= "char" desc= "buy way" >
</struct >
```

Figure 16:
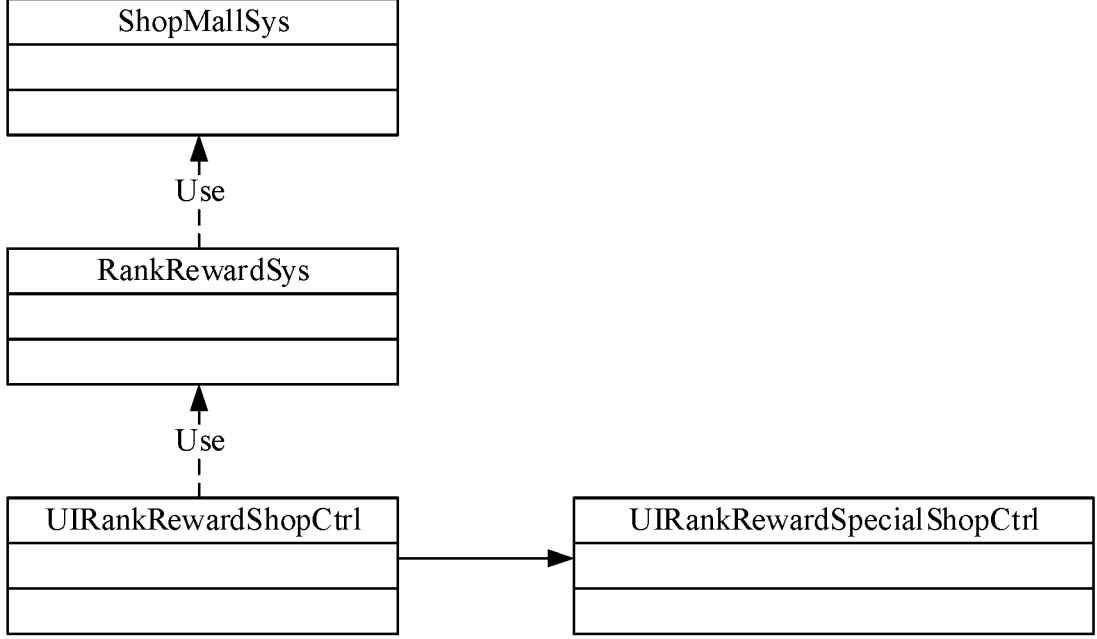
FIG. 16 is a schematic diagram of a purchase function class library of a virtual item according to an exemplary embodiment of the present disclosure.

For example, as shown in FIG. 16, a class RankReward-Sys→GetRankRewardShopMallItemList is used to obtain all items that need to be displayed in the ranking mall, and the item representation reuses a conventional mall logic.

Figure 17:
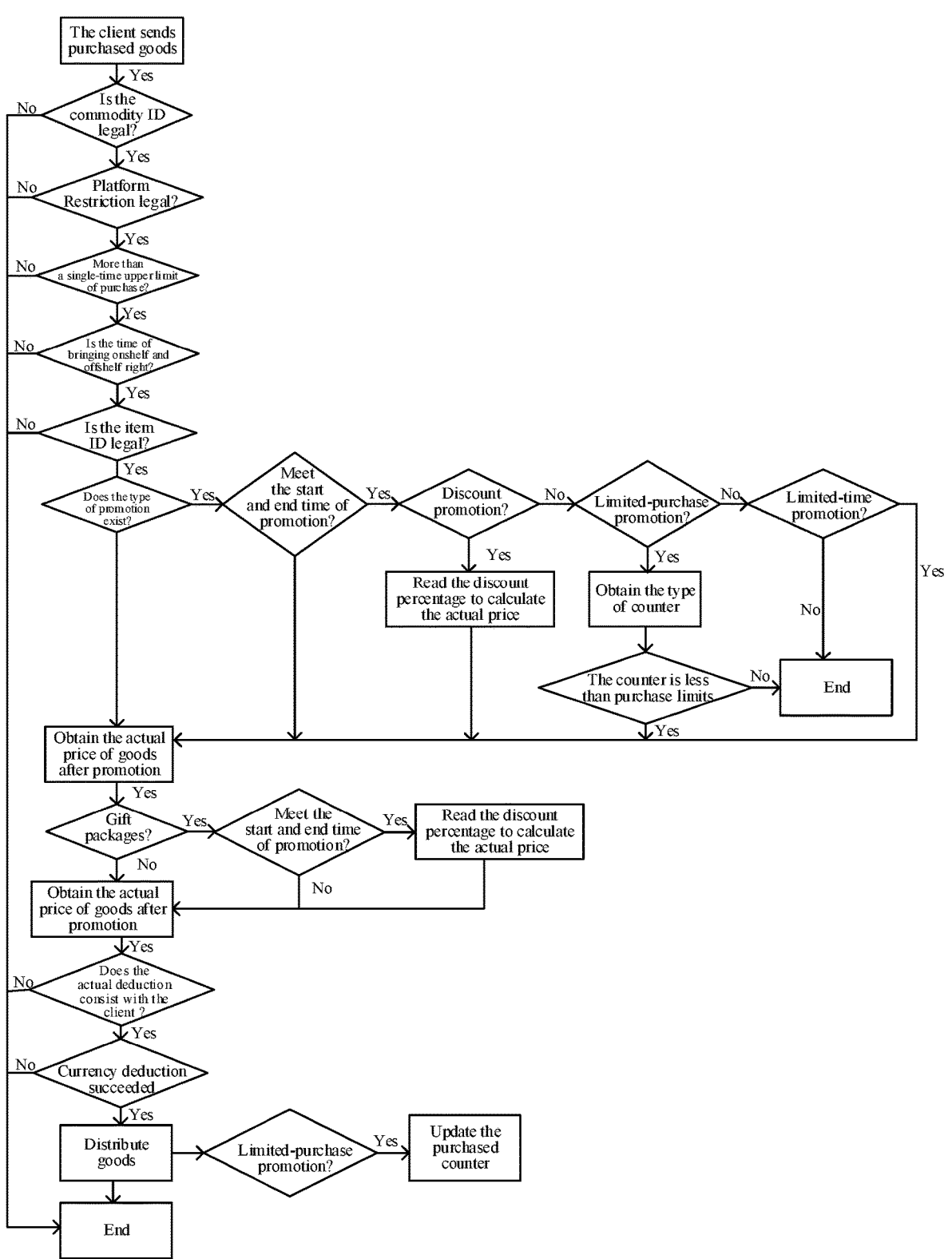
FIG. 17 is a flowchart of a method for obtaining a virtual item according to an exemplary embodiment of the present disclosure.

S2: The server informs the client of quantity change of the ranked coins;

A process flow of the server can be shown in FIG. 17.

S3: The server informs the client of item status change of the virtual item;

S4: The client monitors the change of the ranked coin and item state;

S5: The client refreshes and displays the item status and the quantity of the ranked coins in the ranking mall.

The user can select a virtual item to give to a friend in a user mall, with functions such as a message and a feedback.

Note 1: Giving away a virtual item, a virtual skin, and a virtual champion is currently supported. It is necessary to determine whether the other user owns the virtual skin or virtual champion (a time point is subject to a gift time). If the friend owns it, the user may be prompted that the other user owns and the gift fails; On the contrary, prompt success and deduct the corresponding coins.

Note 2: If the other user still owns the skin or champion when receiving it after the gift is successful, the replacement scheme will be performed.

Figure 18:
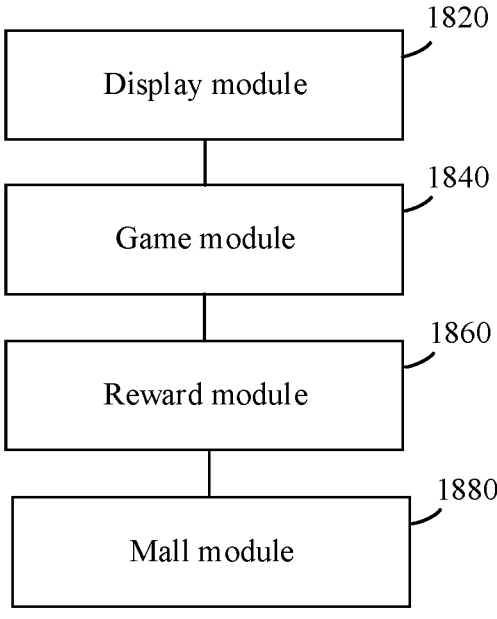
FIG. 18 is a block diagram of an apparatus for obtaining a virtual item according to an exemplary embodiment of the present disclosure.

FIG. 18 shows a schematic diagram of a structure of an apparatus for obtaining a virtual item according to an exemplary embodiment of the present disclosure. The apparatus includes:

a display module 1820, configured to display a competition entrance to a ranking mode, and the ranking mode is one of at least two match modes provided by the client, and the ranking mode is a competition mode for determining a strength rank of a user account in a ranking list;

a game module 1840, configured to control a virtual role of the user account to participate in the ranking competition match in response to a trigger operation on the competition entrance;

a reward module 1860, configured to display a virtual ranked coin obtained by participating in the ranking competition match in the current game season in response to successful participation; and a mall module 1880, configured to obtain a virtual item exclusive to the ranking mode from a ranking mall exclusive to the ranking mode based on the virtual ranked coin.

In some embodiments, the reward module 1860 is configured to display a journey value obtained by participating in the ranking competition match in the current game season in response to successful participation, and the journey value is a value related to the quantity of times the user account participated in the ranking competition in the current game season. When the journey value reaches a level threshold corresponding to a journey level, the obtained virtual ranked coin corresponding to the journey level is displayed.

In some embodiments, the reward module 1860 is configured to display a first quantity of the journey value obtained by participating in the single ranking competition match in the current game season when the user account participates in and wins the single ranking competition match; and when the user account participates in and loses the single ranking competition match, configured to display a second quantity of the journey value obtained by participating in the single ranking competition match in the current game season, where the first quantity is greater than or equal to the second quantity.

In some embodiments, the reward module 1860 is configured to determine hidden scores based on the ranking competition match successfully participated by the user account within a regular time period, and the regular time period is a time period other than a specified time period in the current game season, determine a number n of bonus sessions based on the hidden scores, and display a bonus journey value obtained by participating in the ranking competition match within the specified time period when the user account successfully participates in the ranking competition match in the first n matches of the ranking competition within the specified time period, where the bonus journey value is greater than a single-match journey value obtained by the user account within the regular time period.

In some embodiments, the reward module 1860 is configured to determine a third quantity of the hidden scores if the user account participates in the ranking competition match within the regular time period and wins in the ranking competition, and determine a fourth quantity of the hidden scores when the user account participates in the ranking competition match within the regular time period and loses the ranking competition match, where the third quantity is less than the fourth quantity.

In some embodiments, the mall module 1880 is configured to display an entrance to the ranking mall exclusive to the ranking mode, display the ranking mall interface in response to a trigger operation on the entrance to the ranking mall, where the ranking mall interface includes a virtual item purchased with use of only the virtual ranked coins; The virtual item is obtained by using the virtual ranked coins in response to a purchase operation on the virtual item.

In some embodiments, the mall module 1880 is configured to obtain a game season virtual item exclusive to the current game season, and the game season virtual item includes at least one of a virtual skin, a virtual posture, a virtual special effect, a virtual expression, or a virtual prop for a virtual role; The ranking mall interface is displayed based on the game season virtual item exclusive to the current game season.

In some embodiments, the mall module 1880 is configured to obtain a level virtual item with a purchase privilege based on the journey level of the user account, and the level virtual item includes at least one of a virtual skin, a virtual posture, a virtual special effect, a virtual expression, or a virtual prop for a virtual role; The ranking mall interface is displayed based on the ranked virtual item.

Figure 19:
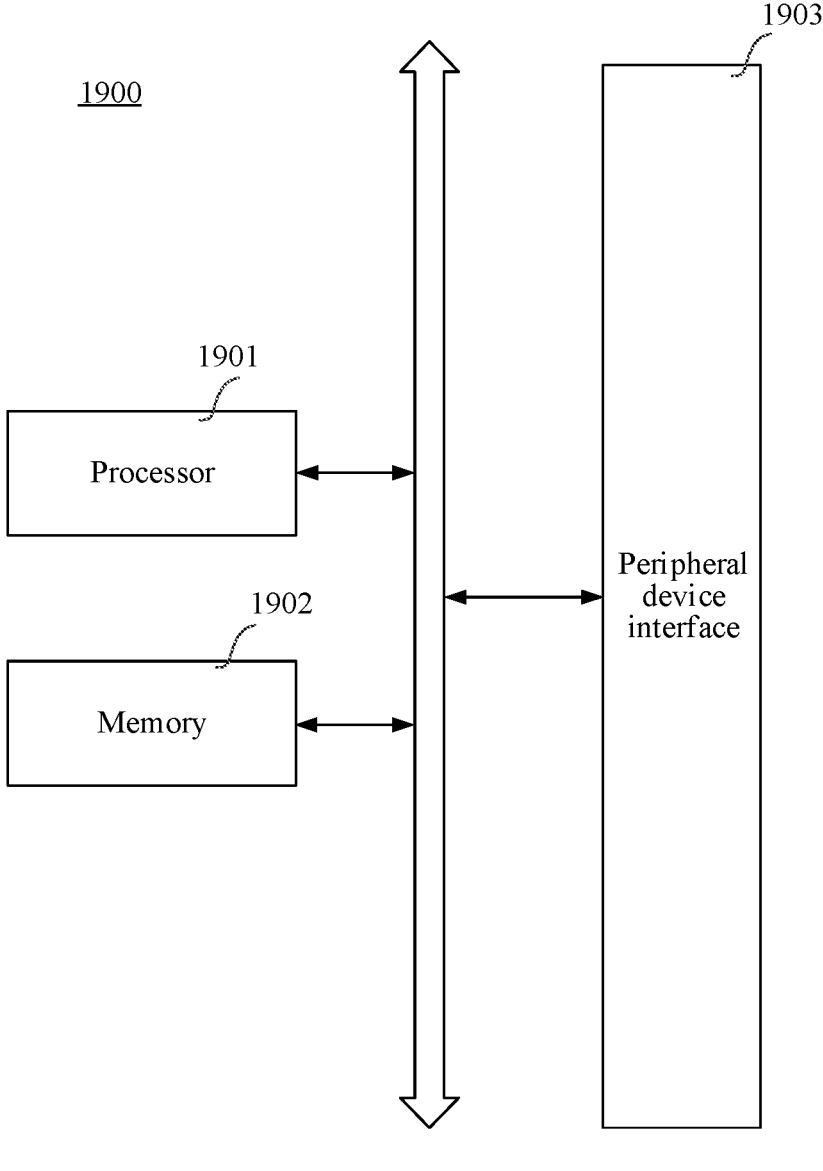
FIG. 19 is a schematic diagram of an apparatus structure of a computer device according to an exemplary embodiment of the present disclosure.

FIG. 19 is a structural block diagram of a computer device 1900 according to an exemplary embodiment of the present disclosure. The computer device 1900 may be a portable mobile terminal, such as a smartphone, a tablet computer, a moving picture experts group audio layer III (MP3) player, or a moving picture experts group audio layer (MP4) player. The computer device 1900 may be further referred to as another name such as user equipment or a portable terminal.

Generally, the computer device 1900 includes a processor 1901 and a memory 1902.

The processor 1901 may include one or more processing cores, for example, a 4-core processor or an 8-core processor. The processor 1901 may be implemented by adopting at least one hardware form of a digital signal processor (DSP), a field-programmable gate array (FPGA), or a programmable logic array (PLA). The processor 1901 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1901 may be integrated with a graphics processing unit (GPU). The GPU is responsible for rendering and drawing content to be displayed by a display screen. In some embodiments, the processor 1901 may further include an artificial intelligence (AI) processor. The AI processor is configured to process computing operations related to machine learning.

The memory 1902 may include one or more computer-readable storage media. The computer-readable storage medium may be tangible and non-transient. The memory 1902 may further include a high-speed random access memory and a nonvolatile memory, for example, one or more disk storage devices or flash storage devices. In some embodiments, the non-transient computer-readable storage medium in the memory 1902 is configured to store at least one instruction and the at least one instruction is configured to executed by the processor 1901 to perform the display method of a virtual environment screen provided in the embodiments of the present disclosure.

In some embodiments, the computer device 1900 further in one embodiment includes a peripheral interface 1903 and at least one peripheral device. Specifically, the peripheral device includes: at least one of a radio frequency, a display screen, an audio circuit 1, or a power supply.

The peripheral interface 1903 may be configured to connect the at least one peripheral related to input/output (I/O) to the processor 1901 and the memory 1902. In some embodiments, the processor 1901, the memory 1902 and the peripheral device interface 1903 are integrated on a same chip or circuit board. In some other embodiments, any one or two of the processor 1901, the memory 1902, and the peripheral device interface 1903 may be implemented on a single chip or circuit board. This is not limited in this embodiment.

In some embodiments, the computer device 1900 further includes one or more sensors. The one or more sensors include, but are not limited to, an acceleration sensor, a gyroscope sensor, a pressure sensor, an optical sensor, and a proximity sensor.

A person skilled in the art may understand that the structure shown in FIG. 19 does not constitute any limitation on the computer device 1900, and the computer device may include more components or fewer components than those shown in the figure, or some components may be combined, or a different component deployment may be used.

Embodiments of the present disclosure further provides a computer device, and the computer device includes a processor and a memory, where the memory stores at least one computer instruction, and the at least one computer instruction is loaded and executed by a processor to perform the method for obtaining a virtual item described in the foregoing method embodiments.

Embodiments of the present disclosure further provides a computer storage medium, where the computer-readable storage medium stores at least one computer instruction, and the at least one computer instruction is loaded and executed by a processor to perform the method for obtaining a virtual item described in the foregoing method embodiments.

Embodiments of the present disclosure further provides a computer program product, and the computer program product includes computer instructions stored in a computer-readable storage medium, when the computer instructions are read and executed by a processor of a computer device from the computer-readable storage medium, the computer device is enabled to perform the method for obtaining a virtual item described in the foregoing method embodiments.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for obtaining a virtual item, performed by a computer device, comprising:

displaying, on a display screen coupled to the computer device, a competition entrance to a ranking mode in a graphical user interface of a client executed on the computer device, wherein the ranking mode is one of at least two match modes provided by the client, and the ranking mode is a competition mode for determining a strength rank of a user account in a ranking list;

controlling a virtual role of the user account to participate in a ranking competition match executed on the client in response to detecting a trigger operation on the competition entrance by a user of the client;

displaying, on the display screen, a virtual ranked coin obtained by participating in the ranking competition match in a current game season in response to a successful participation, comprising:

at an end of the ranking competition match in which the virtual role successfully participates, displaying a graphical settlement interface showing an outcome of the ranking competition match, the graphical settlement interface comprising a first region showing earned experiences and items from the ranking competition match and a progress bar indicating an accumulated journey value obtained by the user in the current game season, the accumulated journey value being related to the virtual ranked coin; and obtaining a virtual item exclusive to the ranking mode from a ranking mall exclusive to the ranking mode based on the virtual ranked coin.

2. The method according to claim 1, wherein displaying the virtual ranked coin obtained by participating in the ranking competition match in the current game season in response to the successful participation comprises:

displaying a journey value obtained by participating in the ranking competition match in the current game season in response to the successful participation, wherein the journey value is a value related to times for which the user account participates in the ranking competition match in the current game season; and displaying an obtained virtual ranked coin corresponding to a journey level when the journey value reaches a level threshold corresponding to the journey level, wherein different journey levels in the current game season correspond to different level thresholds.

3. The method according to claim 2, wherein displaying the journey value obtained by participating in the ranking competition match in the current game season in response to the successful participation comprises:

displaying a first quantity of the journey value obtained by participating in a single ranking competition match in the current game season when the user account participates in and wins the single ranking competition match; and displaying a second quantity of the journey value obtained by participating in the single ranking competition match in the current game season when the user account participates in and loses the single ranking competition match, wherein the first quantity is greater than or equal to the second quantity.

4. The method according to claim 2, wherein displaying the journey value obtained by participating in the ranking competition match in the current game season in response to the successful participation comprises:

determining a hidden score based on a ranking competition match successfully participated by the user account within a regular time period, wherein the regular time period is a time period other than a specified time period in the current game season;

determining a quantity n of bonus sessions based on the hidden score; and displaying a bonus journey value obtained by participating in a ranking competition match within the specified time period when the user account successfully participates in first n ranking competition matches within the specified time period, wherein the bonus journey value is greater than a single-match journey value obtained by the user account within the regular time period.

5. The method according to claim 4, wherein determining the hidden score based on the ranking competition match successfully participated by the user account within the regular time period comprises:

determining a third quantity of the hidden scores when the user account participates in and wins the ranking competition match within the regular time period; and determining a fourth quantity of the hidden scores when the user account participates in and loses the ranking competition match within the regular time period, wherein the third quantity is less than the fourth quantity.

6. The method according to claim 1, wherein obtaining the virtual item exclusive to the ranking mode from the ranking mall exclusive to the ranking mode based on the virtual ranked coin comprises:

displaying an entrance to the ranking mall exclusive to the ranking mode;

displaying a mall interface of the ranking mall in response to a trigger operation on the entrance to the ranking mall, wherein the mall interface of the ranking mall comprises a virtual item purchased only by the virtual ranked coin; and obtaining the virtual item based on the virtual ranked coin in response to a purchase operation on the virtual item.

7. The method according to claim 6, wherein displaying the mall interface of the ranking mall comprises:

obtaining a game season virtual item exclusive to the current game season, wherein the game season virtual item comprises at least one of a virtual skin, a virtual posture, a virtual special effect, a virtual expression, and a virtual prop, for use by the virtual role; and displaying the mall interface of the ranking mall based on the game season virtual item exclusive to the current game season.

8. The method according to claim 6, wherein displaying the mall interface of the ranking mall comprises:

obtaining a level virtual item with purchasing authority based on a journey level of the user account, wherein the level virtual item comprises at least one of a virtual skin, a virtual posture, a virtual special effect, a virtual expression, and a virtual prop, for use by the virtual role; and displaying the mall interface of the ranking mall based on the level virtual item.

9. The method according to claim 1, further comprising:

at the end of the ranking competition match in which the virtual role successfully participates, displaying, in the graphical settlement interface, a list showing journey value rewards received from completed game tasks and a list showing the journey value rewards available to be received from uncompleted tasks.

10. The method according to claim 1, wherein obtaining the virtual item exclusive to the ranking mode from the ranking mall exclusive to the ranking mode based on the virtual ranked coin comprises:

displaying, in the client, an entrance to the ranking mall exclusive to the ranking mode;

displaying a virtual item interface of the ranking mall in response to detecting a trigger operation on the entrance to the ranking mall by the user, wherein the virtual item interface of the ranking mall comprises virtual items accessible only by the virtual ranked coin, each virtual item being having a graphical representation and a required amount of the virtual ranked coin; and obtaining the virtual item based on the virtual ranked coin in response to detecting a confirmation operation on the virtual item by the user.

11. A computer device, comprising a processor and a memory, wherein the memory stores at least one computer instruction, and the at least one computer instruction is loaded and executed by the processor to perform:

displaying, on a display screen coupled to the computer device, a competition entrance to a ranking mode in a graphical user interface of a client executed on the computer device, wherein the ranking mode is one of at least two match modes provided by the client, and the ranking mode is a competition mode for determining a strength rank of a user account in a ranking list;

controlling a virtual role of the user account to participate in a ranking competition match executed on the client in response to detecting a trigger operation on the competition entrance by a user of the client;

displaying, on the display screen, a virtual ranked coin obtained by participating in the ranking competition match in a current game season in response to a successful participation, comprising:

at an end of the ranking competition match in which the virtual role successfully participates, displaying a graphical settlement interface showing an outcome of the ranking competition match, the graphical settlement interface comprising a first region showing earned experiences and items from the ranking competition match and a progress bar indicating an accumulated journey value obtained by the user in the current game season, the accumulated journey value being related to the virtual ranked coin; and obtaining a virtual item exclusive to the ranking mode from a ranking mall exclusive to the ranking mode based on the virtual ranked coin.

12. The computer device according to claim 11, wherein displaying the virtual ranked coin obtained by participating in the ranking competition match in the current game season in response to the successful participation comprises:

displaying a journey value obtained by participating in the ranking competition match in the current game season in response to the successful participation, wherein the journey value is a value related to times for which the user account participates in the ranking competition match in the current game season; and displaying an obtained virtual ranked coin corresponding to a journey level when the journey value reaches a level threshold corresponding to the journey level, wherein different journey levels in the current game season correspond to different level thresholds.

13. The computer device according to claim 12, wherein displaying the journey value obtained by participating in the ranking competition match in the current game season in response to the successful participation comprises:

displaying a first quantity of the journey value obtained by participating in a single ranking competition match in the current game season when the user account participates in and wins the single ranking competition match; and displaying a second quantity of the journey value obtained by participating in the single ranking competition match in the current game season when the user account participates in and loses the single ranking competition match, wherein the first quantity is greater than or equal to the second quantity.

14. The computer device according to claim 12, wherein displaying the journey value obtained by participating in the ranking competition match in the current game season in response to the successful participation comprises:

determining a hidden score based on a ranking competition match successfully participated by the user account within a regular time period, wherein the regular time period is a time period other than a specified time period in the current game season;

determining a quantity n of bonus sessions based on the hidden score; and displaying a bonus journey value obtained by participating in a ranking competition match within the specified time period when the user account successfully participates in first n ranking competition matches within the specified time period, wherein the bonus journey value is greater than a single-match journey value obtained by the user account within the regular time period.

15. The computer device according to claim 14, wherein determining the hidden score based on the ranking competition match successfully participated by the user account within the regular time period comprises:

determining a third quantity of the hidden scores when the user account participates in and wins the ranking competition match within the regular time period; and determining a fourth quantity of the hidden scores when the user account participates in and loses the ranking competition match within the regular time period, wherein the third quantity is less than the fourth quantity.

16. The computer device according to claim 11, wherein obtaining the virtual item exclusive to the ranking mode from the ranking mall exclusive to the ranking mode based on the virtual ranked coin comprises:

displaying an entrance to the ranking mall exclusive to the ranking mode;

displaying a mall interface of the ranking mall in response to a trigger operation on the entrance to the ranking mall, wherein the mall interface of the ranking mall comprises a virtual item purchased only by the virtual ranked coin; and obtaining the virtual item based on the virtual ranked coin in response to a purchase operation on the virtual item.

17. The computer device according to claim 16, wherein displaying the mall interface of the ranking mall comprises:

obtaining a game season virtual item exclusive to the current game season, wherein the game season virtual item comprises at least one of a virtual skin, a virtual posture, a virtual special effect, a virtual expression, and a virtual prop, for use by the virtual role; and displaying the mall interface of the ranking mall based on the game season virtual item exclusive to the current game season.

18. The computer device according to claim 16, wherein displaying the mall interface of the ranking mall comprises:

obtaining a level virtual item with purchasing authority based on a journey level of the user account, wherein the level virtual item comprises at least one of a virtual skin, a virtual posture, a virtual special effect, a virtual expression, and a virtual prop, for use by the virtual role; and displaying the mall interface of the ranking mall based on the level virtual item.

19. A non-transitory computer readable storage medium, storing at least one computer instruction, the at least one computer instruction being loaded and executed by a processor of a computer device to perform:

displaying, on a display screen coupled to the computer device, a competition entrance to a ranking mode in a graphical user interface of a client executed on the computer device, wherein the ranking mode is one of at least two match modes provided by the client, and the ranking mode is a competition mode for determining a strength rank of a user account in a ranking list;

controlling a virtual role of the user account to participate in a ranking competition match executed on the client in response to detecting a trigger operation on the competition entrance by a user of the client;

displaying, on the display screen, a virtual ranked coin obtained by participating in the ranking competition match in a current game season in response to a successful participation, comprising:

at an end of the ranking competition match in which the virtual role successfully participates, displaying a graphical settlement interface showing an outcome of the ranking competition match, the graphical settlement interface comprising a first region showing earned experiences and items from the ranking competition match and a progress bar indicating an accumulated journey value obtained by the user in the current game season, the accumulated journey value being related to the virtual ranked coin; and obtaining a virtual item exclusive to the ranking mode from a ranking mall exclusive to the ranking mode based on the virtual ranked coin.

20. The storage medium according to claim 19, wherein displaying the virtual ranked coin obtained by participating in the ranking competition match in the current game season in response to the successful participation comprises:

displaying a journey value obtained by participating in the ranking competition match in the current game season in response to the successful participation, wherein the journey value is a value related to times for which the user account participates in the ranking competition match in the current game season; and displaying an obtained virtual ranked coin corresponding to a journey level when the journey value reaches a level threshold corresponding to the journey level, wherein different journey levels in the current game season correspond to different level thresholds.

\* \* \* \* \*